No. 867,143. PATENTED SEPT. 24, 1907.
H. D. LAIDLAW.
APPARATUS FOR PURIFYING AND AGING LIQUORS.
APPLICATION FILED APR. 25, 1904. RENEWED JAN. 21, 1907.
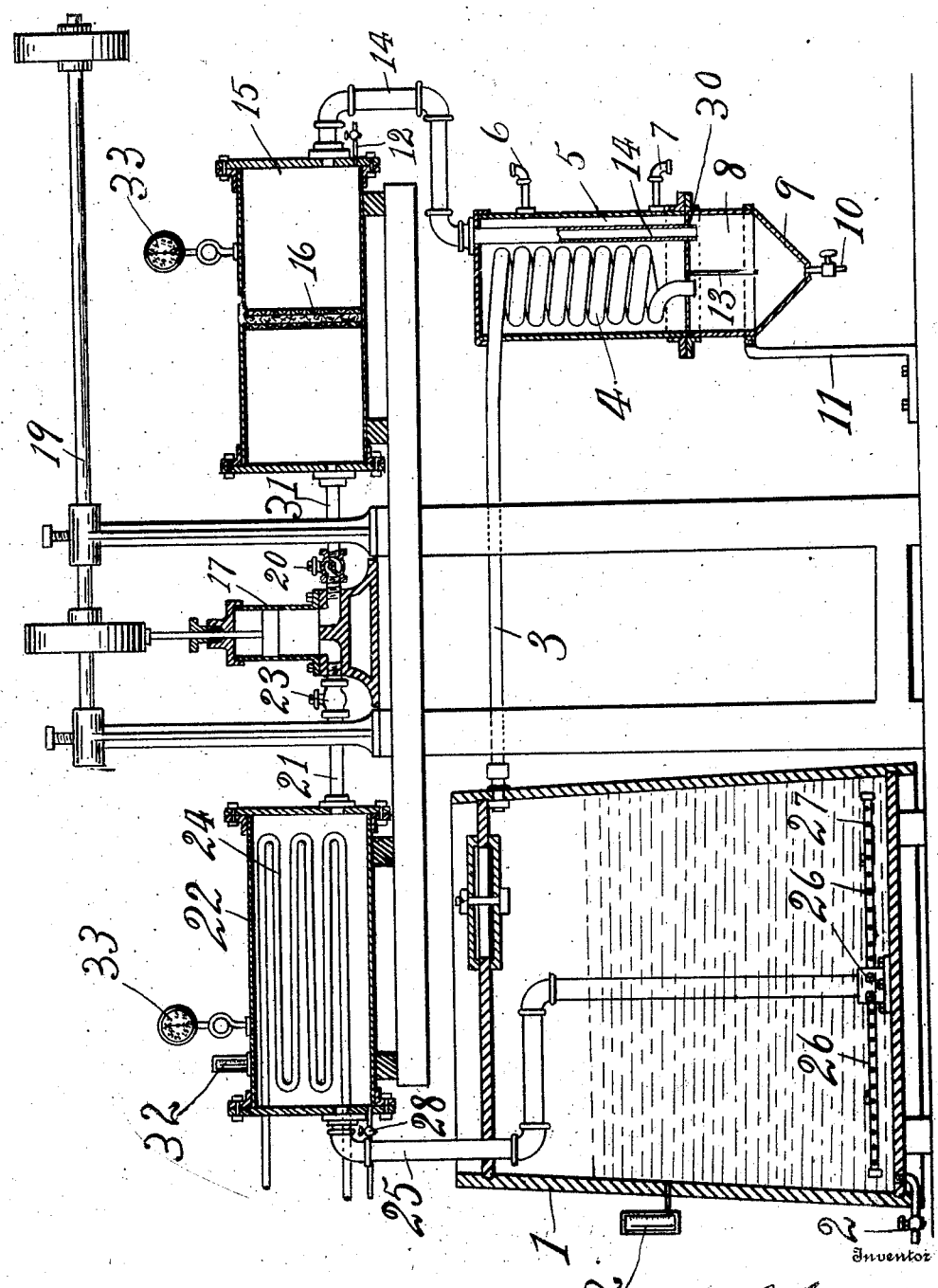

UNITED STATES PATENT OFFICE.

HENRI D. LAIDLAW, OF SAN FRANCISCO, CALIFORNIA, ASSIGNOR OF ONE-THIRD TO WILLIAM H. BURNETT AND ONE-THIRD TO WARREN D. PARSON, BOTH OF SAN FRANCISCO, CALIFORNIA.

APPARATUS FOR PURIFYING AND AGING LIQUORS.

No. 867,143. Specification of Letters Patent. Patented Sept. 24, 1907.

Application filed April 25, 1904, Serial No. 204,737. Renewed January 21, 1907. Serial No. 353,365.

*To all whom it may concern:*

Be it known that I, HENRI D. LAIDLAW, a citizen of the United States, residing at San Francisco, in the county of San Francisco and State of California, have invented certain new and useful Improvements in Apparatus for Purifying and Aging Liquors, of which the following is a specification.

This invention relates to an improved apparatus for purifying and aging liquors, such as whisky, brandy and other spirituous liquors, wine, beer, ale, cider and the like, and for the extraction therefrom of volatile and other oils and gases and acids, noxious and other odors, and organic and inorganic impurities.

It is also adapted for the extraction of other volatile liquids from compound liquids, as, for instance gasolene, benzin, and other distillates, from petroleum.

My invention therefore resides in the novel construction, combination, and arrangement of parts for the above ends, hereinafter fully specified and particularly pointed out in the claims.

In the accompanying drawing, the figure is a vertical section of my improved apparatus.

Referring to the drawing, 1 represents an air-tight tank having at the bottom a draw off pipe 2. From the top of said tank, a pipe 3 leads to a worm 4 in a chamber 5 either open or closed provided with inlet 6 and outlet 7, so that into said chamber may be introduced either a cooling or a heating fluid. In nearly all of the processes for which my improved apparatus is peculiarly adapted a cooling medium will be introduced into said chamber, which will be maintained at a temperature of about 30° Fahrenheit. Attached to the bottom of said chamber is a cylindrical chamber 8 having a conical bottom 9 terminating in a pipe and draw off cock 10. 11 is a support for said chambers. The lower chamber 8 is divided by a vertical partition 13. The lower end of the worm 4 passes the diaphragm 30 forming the bottom of the upper chamber 5 and enters the lower chamber on one side of said partition 13 and from said chamber on the other side of the partition extends a pipe 14 which leads upwards through the upper chamber 5 and out from the top thereof to the end of a vacuum chamber 15. In the middle of said vacuum chamber is a fume arrester 16 preferably formed of screens having any suitable pervious substance therebetween. The gases are exhausted from said chamber by means of a single-acting air pump 17 operated from a shaft 18, at about 130 strokes a minute, said pump being connected with said vacuum chamber through a pipe 31 having therein a check valve 20 permitting the gases to flow from the vacuum chamber to the pump, but arresting their return movement. During each complete stroke of the pump, the gases are drawn rapidly against and through the fume arrester and the succeeding gases then checked thereat. These fluctuations in pressure and velocity of the gases at the fume arrester tend to partly condense the gases and to separate the impurities therefrom. A pipe 21 leads from said pump to a heating chamber 22, said pipe having therein a check valve 23 preventing the return movement of the gases. On entering said heating chamber said gases are heated by a steam coil 24 therein, and a pipe 25 leads from said heating chamber to the bottom of the tank 1 where it is connected to a number of radial arms 26 having small openings 27 therein. 12 represents a draw off pipe for the chamber 15, for drawing off the impurities condensed at the fume arrester 16, and 28 a similar pipe for the heating chamber 22. This latter pipe 28 may also be used for injecting oxygen to be mixed with the liquid to oxidize the same. 32 are thermometers and 33 pressure gages.

The operation of the apparatus is as follows: Upon the pump being set in motion the air is drawn from the tank 1 through the worm and vacuum chamber to the pump and is discharged into the heating chamber 22, which is maintained at a temperature of about 90° Fahrenheit and is heated thereby, and then passes from said heating chamber down to the bottom of the tank 1 whence it rises to the top of said tank through the liquid therein. After a continued repetition of this process the fumes and vapors arising from the tank are partly distilled by the worm, and a change is effected in their chemical composition. In fact the process consists of a series of repeated distillations. The liquid in the tank becomes in time sufficiently heated to give off the vapors somewhat rapidly, and these are again condensed, the liquid part thereof dropping into the conical portion of the chamber 8 while the gaseous part freed from said liquid portion flows back into the tank. The character of the liquid in the tank thus becomes changed. Such substance as fusel oil are readily extracted from whisky and spirituous and alcoholic liquids are in a very short time aged and much improved in character.

While the apparatus is especially designed for alcoholic liquors, it is not restricted thereto, as it may be used with advantage in other cases where it is desired to separate heavy ingredients and impurities from lighter ingredients of the compound.

I claim:—

In an apparatus of the character described, the combination of a closed tank, a pipe leading from the upper portion thereof, a worm connected to said pipe, a chamber inclosing said worm and adapted to contain a cooling medium, a chamber into which the lower end of the worm enters, means for drawing off liquid from said latter chamber, a pipe leading upwards from said latter chamber, a vacuum chamber with which said pipe connects, a pump connected to said vacuum chamber to exhaust the same, a permeable partition in said vacuum chamber forming a fume arrester, means for drawing off liquids from said vacuum chamber, a heating chamber into which the gases exhausted from said vacuum chamber are discharged by said pump, means for heating said heating chamber and a connection from said heating chamber to the tank to conduct the heated gases thereto, substantially as described.

In witness whereof I have hereunto set my hand in the presence of two subscribing witnesses.

HENRI D. LAIDLAW.

Witnesses:
 FRANCIS M. WRIGHT,
 BESSIE GORFINKEL.